US011967281B2

(12) United States Patent
Zhou et al.

(10) Patent No.: US 11,967,281 B2
(45) Date of Patent: Apr. 23, 2024

(54) DRIVING CIRCUIT, DRIVING METHOD, AND DISPLAY PANEL

(71) Applicant: HKC CORPORATION LIMITED, Shenzhen (CN)

(72) Inventors: Renjie Zhou, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/339,051

(22) Filed: Jun. 21, 2023

(65) Prior Publication Data

US 2024/0087522 A1 Mar. 14, 2024

(30) Foreign Application Priority Data

Sep. 8, 2022 (CN) ......................... 202211092393.4

(51) Int. Cl.
*G09G 3/3233* (2016.01)
*G09G 3/20* (2006.01)

(52) U.S. Cl.
CPC ......... *G09G 3/3233* (2013.01); *G09G 3/2096* (2013.01); *G09G 2300/0426* (2013.01);
(Continued)

(58) Field of Classification Search
CPC ............... G09G 3/3233; G09G 3/2096; G09G 2300/0426; G09G 2300/0819;
(Continued)

(56) References Cited

U.S. PATENT DOCUMENTS 10,629,121 B2 4/2020 Zhu et al.
2008/0218497 A1* 9/2008 Takahashi ............ G09G 3/3233 345/204
(Continued)

FOREIGN PATENT DOCUMENTS

CN 101221726 A 7/2008
CN 101261808 A 9/2008
(Continued)

OTHER PUBLICATIONS

First Office Action issued in counterpart Chinese Patent Application No. 202211092393.4, dated Oct. 18, 2022.
(Continued)

*Primary Examiner* — Hong Zhou
(74) *Attorney, Agent, or Firm* — Westbridge IP LLC

(57) ABSTRACT

Disclosed are a driving circuit, a driving method, and a display panel. The method includes: turning on the first thin film transistor to control the voltage of the first node to be an initialization voltage; then controlling the voltage of the second node to be a threshold voltage based on the respective voltage difference between the initialization voltage and the turned-on second and the fourth thin film transistor; turning on the third thin film transistor to compensate the threshold voltage to obtain a driving voltage; turning on the fifth thin film transistor to access the driving current by the driving voltage, the driving current is controlled to pass through the turned-on sixth thin film transistor to drive the light-emitting diode.

5 Claims, 4 Drawing Sheets

(52) U.S. Cl.
CPC ............... *G09G 2300/0819* (2013.01); *G09G 2300/0842* (2013.01); *G09G 2300/0861* (2013.01); *G09G 2310/08* (2013.01); *G09G 2320/0233* (2013.01)

(58) Field of Classification Search
CPC ... G09G 2300/0842; G09G 2300/0861; G09G 2310/08; G09G 2320/0233
See application file for complete search history.

(56) References Cited

U.S. PATENT DOCUMENTS

| | | | | |
|---|---|---|---|---|
| 2012/0235972 | A1* | 9/2012 | Liu | G09G 3/3233 345/76 |
| 2017/0110055 | A1 | 4/2017 | Li et al. | |
| 2018/0190185 | A1 | 7/2018 | Ko et al. | |
| 2019/0156750 | A1 | 5/2019 | Dong | |
| 2020/0243013 | A1* | 7/2020 | Wang | G09G 3/3233 |
| 2021/0035502 | A1 | 2/2021 | Lee et al. | |
| 2021/0183304 | A1 | 6/2021 | Takasugi | |
| 2021/0398484 | A1* | 12/2021 | Du | G09G 3/3258 |

FOREIGN PATENT DOCUMENTS

| | | | |
|---|---|---|---|
| CN | 203858845 | U | 10/2014 |
| CN | 105161051 | A | 12/2015 |
| CN | 105427803 | A | 3/2016 |
| CN | 105448244 | A | 3/2016 |
| CN | 105789250 | A | 7/2016 |
| CN | 105989791 | A | 10/2016 |
| CN | 106652904 | A | 5/2017 |
| CN | 106875894 | A | 6/2017 |
| CN | 107863069 | A | 3/2018 |
| CN | 107993612 | A | 5/2018 |
| CN | 108492770 | A | 9/2018 |
| CN | 109584784 | A | 4/2019 |
| CN | 109801596 | A | 5/2019 |
| CN | 110459167 | A | 11/2019 |
| CN | 114093319 | A | 2/2022 |
| CN | 114664246 | A | 6/2022 |
| CN | 114999400 | A | 9/2022 |
| CN | 115171608 | A | 10/2022 |
| KR | 20130055450 | A | 5/2013 |
| KR | 20210069948 | A | 6/2021 |
| WO | 2022164078 | A1 | 8/2022 |

OTHER PUBLICATIONS

International Search Report and Written Opinion issued in corresponding PCT Application No. PCT/CN2023/094615, dated Sep. 11, 2023.

* cited by examiner

DRIVING CIRCUIT, DRIVING METHOD, AND DISPLAY PANEL

CROSS-REFERENCE TO RELATED APPLICATIONS

This application claims priority to Chinese Patent Application No. 202211092393.4, filed on Sep. 8, 2022, the entire disclosure of which is incorporated herein by reference.

TECHNICAL FIELD

The present disclosure relates to the technical field of liquid crystal display, and in particular to a driving circuit, a driving method, and a display panel.

BACKGROUND

Organic Light-Emitting Diode (OLED) display is an active light-emitting display device, which, as one of the main technologies in the new display technology, has the advantages such as high density, wide viewing angle, fast response speed, and low power consumption and so on. However, the light-emitting diode in OLED display is driven by the thin-film transistor to emit light, and there are threshold voltage and parasitic capacitance in the thin-film transistor. The threshold voltage is easily changed by the temperature, so that the driving current output from the thin-film transistor to the light-emitting diode fluctuates, resulting in uneven light of the OLED display. The residual charges generated by the parasitic capacitance will cause a time difference in the driving current output from the thin film transistor to the light-emitting diode, resulting in an afterimage problem caused by inaccurate light in the OLED display.

Therefore, based on the above-mentioned situation, the uneven and inaccurate light caused by the thin film transistor driving to emit light degrades the image display quality of the OLED display, resulting in poor image visibility.

SUMMARY

The main purpose of the present disclosure is to provide a driving circuit, a driving method, and a display panel, which aims to solve the technical problem of uneven and inaccurate light of OLED display caused by that the light-emitting diode is driven to emit light through the thin-film transistor with threshold voltage and parasitic capacitance.

In order to achieve the above purpose, the embodiments of the present disclosure propose a driving circuit. The driving circuit includes:

- a voltage initialization module;
- a voltage compensation module connected to the voltage initialization module; and
- a light-emitting diode connected to the voltage initialization module;
- where the voltage compensation module is configured to compensate a threshold voltage of the driving circuit to obtain a driving voltage, and make the driving circuit connect to a driving current based on the driving voltage;
- the voltage initialization module is configured to eliminate residual charges, to make the driving circuit drive the light-emitting diode through the driving current;
- the voltage compensation module includes a first thin film transistor, a second thin film transistor, a third thin film transistor, a fourth thin film transistor, a fifth thin film transistor and a capacitor;

- a control terminal of the fifth thin film transistor is connected to the positive electrode of the capacitor; the first thin film transistor and the second thin film transistor are connected in series to the positive electrode of the capacitor, and an output terminal of the fifth thin film transistor is connected to a connection point where the first thin film transistor T1 is connected to the second thin film transistor, and an input terminal of the fifth thin film transistor is connected to the driving current of the driving circuit;
- the third thin film transistor and the fourth thin film transistor are connected in parallel to the negative electrode of the capacitor.

In an embodiment, the voltage initialization module includes a sixth thin film transistor;

- an input terminal of the sixth thin film transistor is connected to the connection point where the first thin film transistor is connected to the second thin film transistor, a control terminal of the sixth thin film transistor is connected to an emission signal of the driving circuit, and an output terminal of the sixth thin film transistor is connected to the light-emitting diode.

In an embodiment, an output terminal of the first thin film transistor is connected to an input terminal of the second thin film transistor, an output terminal of the second thin film transistor is connected to a positive electrode of the capacitor, an output terminal of the third thin film transistor is connected to a negative electrode of the capacitor, and an output terminal of the fourth thin film transistor is connected to the negative electrode of the capacitor;

- in response to that a control terminal of the first thin film transistor is turned on by a high level, control terminals of the second thin film transistor, the third thin film transistor and the fourth thin film transistor are turned off by a low level, respectively.

In an embodiment, in response to that the control terminals of the first thin film transistor, the second thin film transistor and the fourth thin film transistor are turned on by the high level, respectively, the control terminal of the third thin film transistor is turned off by the low level.

In an embodiment, in response to that the control terminals of the first thin film transistor and the third thin film transistor are turned on by the high level, respectively, the control terminals of the second thin film transistor and the fourth thin film transistor are turned off by the low level, respectively.

In an embodiment, the output terminal of the fifth thin film transistor is connected to an input terminal of the six thin film transistor;

- in response to that the control terminal of the fifth thin film transistor is turned on by the driving voltage, and the control terminal of the six thin film transistor is turned on by the high level, the control terminals of the first thin film transistor, the second thin film transistor, the third thin film transistor and the fourth thin film transistor are turned off by the low level, respectively.

In an embodiment, the driving circuit further includes a controller;

- wherein the control terminal of the first thin film transistor is connected to the a first level signal output terminal of the controller, the control terminals of the second thin film transistor and the fourth thin film transistor are connected to a second level signal output terminal of the controller respectively; and
- the control terminal of the third thin film transistor is connected to a third level signal output terminal of the controller, and the control terminal of the six thin film transistor is connected to the emission signal terminal of the controller.

The present disclosure further provides a driving method, including:

turning on a first thin film transistor in a voltage compensation module, to control a voltage of a first node to be an initialization voltage, the first node is a connection point where the first thin film transistor is connected to a second thin film transistor in the voltage compensation module;

turning on the second thin film transistor and a fourth thin film transistor in the voltage compensation module, to control a voltage of the second node to be a threshold voltage, based on voltage differences between the initialization voltage and the second thin film transistor and the fourth thin film transistor, respectively, where the second node is a connection point where the fifth thin film transistor and a capacitor in the voltage compensation module are connected to the fifth thin film transistor;

turning on a third thin film transistor in the voltage compensation module to compensate the threshold voltage to obtain a driving voltage;

after the fifth thin film transistor in the voltage compensation module is turned on by the driving voltage, and based on that the fifth thin film transistor is connected to a driving current, controlling the driving current to flow through the sixth thin film transistor turned on in the voltage initialization module, to drive the light-emitting diode in a driving circuit.

In addition, in order to achieve the above purpose, the present disclosure also provides a display panel, including the above-mentioned driving circuit, the memory, the processor, and the computer processing program stored in the memory and operable on the processor. The processor, when executing the computer processing program, implements the above driving method.

In the present disclosure, a voltage compensation module and a voltage initialization module are added to the existing pixel driving circuit that outputs the drive current. The voltage compensation module corrects the driving current output to the voltage initialization module, so as to compensate the variation of the threshold voltage caused by the variation of the temperature. The driving current is used to drive the light-emitting diode to emit light. The voltage initialization module eliminates the residual charges generated by the parasitic capacitance, which solves the problem of the uneven light of the OLED display caused by the fluctuation of the output driving current due to the variation of the threshold voltage, and the problem of inaccurate light of the OLED display caused by the time difference of the output driving current due to residual charges. Therefore, the image quality of the OLED display is improved, to achieve an excellent image visual effect.

The realization of the purpose, functional characteristics, and advantages of the present disclosure will be further described in conjunction with the embodiments and with reference to the accompanying drawings.

DETAILED DESCRIPTION OF THE EMBODIMENTS

It should be understood that the specific embodiments described herein are only used to explain the present disclosure, and are not intended to limit the present disclosure.

The main solution of the embodiment of the present disclosure is as follows: the voltage compensation module compensates the variation of the threshold voltage caused by variation of the temperature, and the voltage initialization module eliminates the residual charges generated by the parasitic capacitance, thereby avoiding the abnormal fluctuation of the driving current caused by the threshold voltage and parasitic capacitance in the thin film transistor, which in turn leads to uneven and inaccurate light of the light-emitting diode.

In the related art, the temperature of the thin film transistor will rise due to long-time operation of the OLED display, resulting in a time difference in the driving time of the driving current and a threshold voltage error of the driving current, to further lead to low image appreciation and afterimage problem caused by uneven light of the OLED display.

The present disclosure provides a solution. By adding a voltage compensation module and a voltage initialization module to the existing pixel driving circuit that outputs the drive current, the voltage compensation module compensates the variation of threshold voltage caused by variation of temperature, and the voltage initialization module eliminates the residual charges generated by the parasitic capacitance, which solves the problem of uneven light of the OLED display caused by the fluctuation of the output driving current due to the variation of the threshold voltage, and the problem of inaccurate light of the OLED display caused by the time difference of the output driving current due to residual charge. Therefore, the image quality of the OLED display is improved, to achieve an excellent image visual effect.

Figure 1:
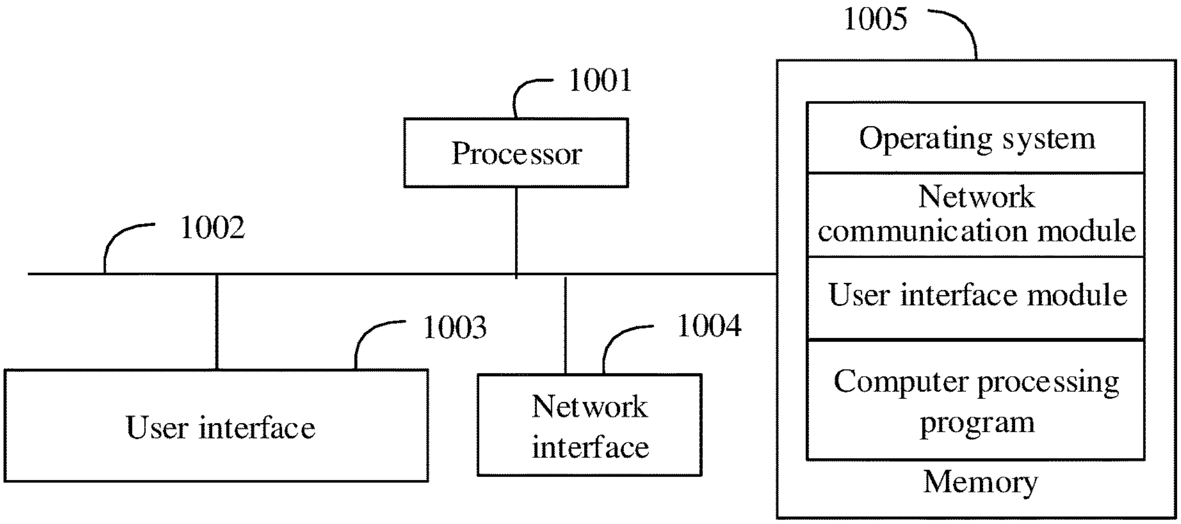
FIG. 1 is a schematic structural diagram of a terminal of the hardware operating environment involved in an embodiment of the present disclosure.

As shown in FIG. 1, FIG. 1 is a schematic structural diagram of a terminal of a hardware operating environment involved in an embodiment of the present disclosure.

The carrier of the driving method in the embodiment of the present disclosure is a display panel. As shown in FIG. 1, the display panel may include: a processor 1001, such as a CPU; a network interface 1004; a user interface 1003; a memory 1005; and a communication bus 1002. The communication bus 1002 is used for connection and communication among the above components. The user interface 1003 may include a display, an input unit such as a keyboard, a standard wired interface and a wireless interface.

The network interface 1004 may include a standard wired interface and a wireless interface such a WI-FI interface. The memory 1005 may be a high-speed RAM memory or a non-volatile memory such as a disk memory. The memory 1005 may also be a storage device independent of the aforementioned processor 1001.

In an embodiment, the display panel may also include a webcam, a radio frequency (RF) circuit, a sensor, an audio circuit, a WiFi module, etc. The sensor may be a light sensor, a motion sensor or other sensors. More specifically, the light sensor may include an ambient light sensor and a proximity sensor. The ambient light sensor can adjust the brightness of the screen according to the brightness of the ambient light, and the proximity sensor can turn off the screen and/or the backlight when the mobile terminal device moves to the ear. As a kind of motion sensor, the gravity acceleration sensor can detect the magnitude of acceleration in various directions (generally in three coordinate axes). It can detect the magnitude and direction of gravity when it is stationary, and it can also be applied on the application that identifies the posture of mobile terminal device (such as horizontal and vertical screen switching, related games, magnetometer posture calibration), vibration recognition related functions (such as pedometer, tapping), etc. Certainly, the mobile terminal device may also be configured with other sensors such as a gyroscope, a barometer, a hygrometer, a thermometer, or an infrared sensor, which will not be repeated here.

Those skilled in the art can understand that the structure of the display panel shown in FIG. 1 does not constitute a limitation on the display panel, and may include more or fewer components, a combination of some components, or differently arranged components than shown in the figure.

As shown in FIG. 1, the memory 1005 as a computer storage medium may include an operating system, a network communication module, a user interface module, and a computer processing program.

In the terminal shown in FIG. 1, the network interface 1004 is mainly used for connecting to the background server and performing data communication with the background server. The user interface 1003 is mainly used for connecting to the client side and performing data communication with the client side; and the processor 1001 can be used for calling the computer processing program stored in the memory 1005, and performing the following operations:

- turning on a first thin film transistor in a voltage compensation module, to control a voltage of a first node to be an initialization voltage, the first node is a connection point where the first thin film transistor is connected to a second thin film transistor in the voltage compensation module;
- turning on the second thin film transistor and a fourth thin film transistor in the voltage compensation module, to control a voltage of the second node to be a threshold voltage, based on voltage differences between the initialization voltage and the second thin film transistor and the fourth thin film transistor, respectively, the second node is a connection point where the fifth thin film transistor and a capacitor in the voltage compensation module are connected to the fifth thin film transistor;
- turning on a third thin film transistor in the voltage compensation module to compensate the threshold voltage to obtain a driving voltage;
- after the fifth thin film transistor in the voltage compensation module is turned on by the driving voltage, and based on that the fifth thin film transistor is connected to a driving current, controlling the driving current to flow through the sixth thin film transistor turned on in the voltage initialization module, to drive the light-emitting diode in a driving circuit.

Figure 2:
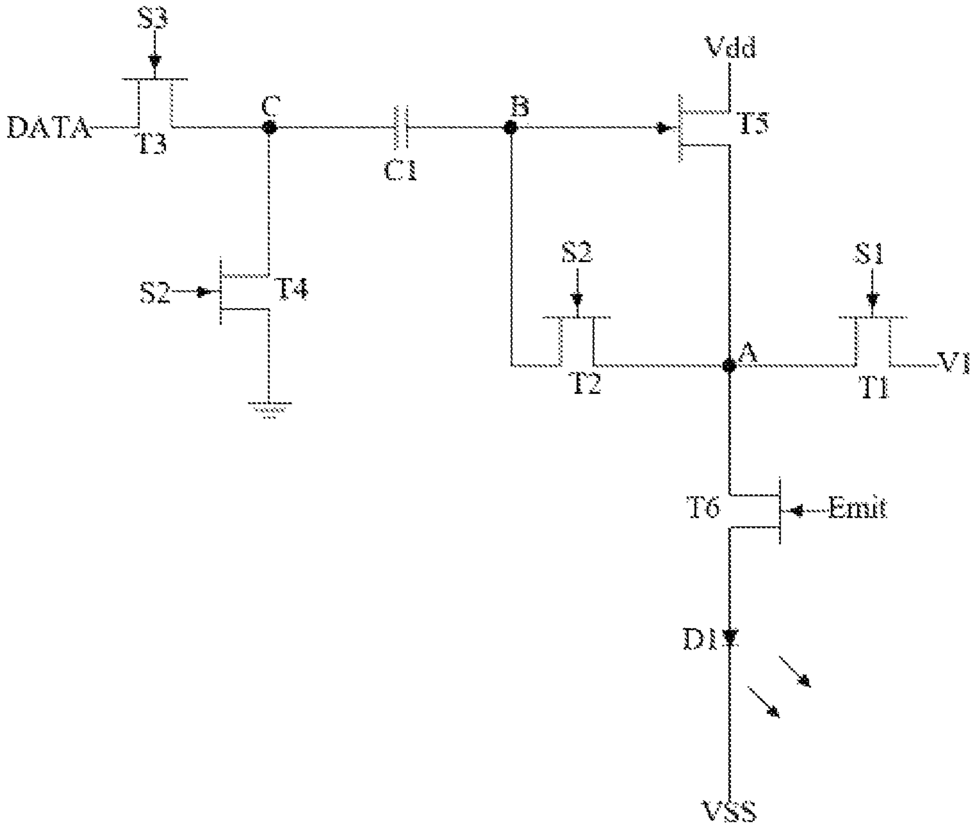
FIG. 2 is a schematic structural diagram of a driving circuit.

Referring to FIG. 2, the present disclosure provides a driving circuit, including:

- a voltage initialization module;
- a voltage compensation module connected to the voltage initialization module; and
- a light-emitting diode D1 connected to the voltage initialization module;
- where the voltage compensation module is configured to compensate a threshold voltage of the driving circuit to obtain a driving voltage, and make the driving circuit connect to a driving current based on the driving voltage;
- the voltage initialization module is configured to eliminate residual charges, to make the driving circuit drive the light-emitting diode D1 through the driving current.

FIG. 2 shows a driving circuit with a single light-emitting diode D1, but actually there are multiple driving circuits in one display panel. The purpose of the present disclosure is to ensure the uniformity and accuracy of the luminous brightness of the light-emitting diodes D1 among multiple driving circuits, and to avoid insufficient luminous intensity and unexpected light of some light-emitting diodes D1 due to the fluctuation of the threshold voltage Vth and the residual capacitor C1, resulting in a low picture quality of the OLED display.

The driving circuit in the embodiment includes a voltage compensation module and a voltage initialization module, there are three nodes in the voltage compensation module, namely a first node A, a second node B and a third node C. Based on the conduction sequence between different thin film transistors in the voltage compensation module, different voltages are respectively input into the first node A, the second node B and the third node C, so as to initialize the voltage on the first node A, to avoid the positive voltage of the light-emitting diode D1 from different caused by the coupling capacitor C1 or the residual charges, and further avoid the problem that the light-emitting diode D1 emits light due to different when there is no need to emit light. Then the threshold voltage Vth on the second node B is compensated, so as to avoid the reduction of the driving current caused by the reduced threshold voltage Vth, resulting in insufficient luminous intensity of the light-emitting diode D1 and uneven luminous brightness.

For example, a high level is input to the control terminal of the first thin film transistor T1 in each driving circuit through the first level signal output terminal S1, so that the first thin film transistor T1 in each driving circuit is turned on. Based on the turned-on first thin film transistor T1, an initialization voltage Vref is written into the voltage writing terminal V1, and the initialization voltage Vref at this time will initialize the voltage in the first node A through the first thin film transistor T1, to ensure that the positive voltage of the light-emitting diode D1 in each driving circuit is stable at the same voltage, to eliminate the residual charges at the connection point where the sixth thin film transistor T6 is connected to the light-emitting diode D1 in the voltage initialization module. In this way, it avoids the difference of the positive voltage of the light-emitting diode D1 caused by the residual charges, which will lead to the problem that the light-emitting diode D1 emits light when there is no need to emit light.

The voltage compensation module includes a first thin film transistor T1, a second thin film transistor T2, a third thin film transistor T3, a fourth thin film transistor T4, a fifth thin film transistor T5 and a capacitor C1.

The control terminal of the fifth thin film transistor T5 is connected to the positive electrode of the capacitor C1; the first thin film transistor T1 and the second thin film transistor T2 are connected in series to the positive electrode of the capacitor C1, and the output terminal of the fifth thin film transistor T5 is connected to a connection point where the first thin film transistor T1 is connected to the second thin film transistor T2, and the input terminal of the fifth thin film transistor T5 is connected to the driving current of the driving circuit.

The third thin film transistor T3 and the fourth thin film transistor T4 are connected in parallel to the negative electrode of the capacitor C1.

In the embodiment, the first thin film transistor T1, the second thin film transistor T2, the third thin film transistor T3, the fourth thin film transistor T4 and the fifth thin film transistor T5 are all described as N-type transistors.

However, in practice, the first thin film transistor T1, the second thin film transistor T2, the third thin film transistor T3 and the fourth thin film transistor T4 may also be P-type transistors.

The capacitor C1 is a cross-connected capacitor, which is connected between the third node C and the second node B, and can compensate the threshold voltage Vth on the second node B by accessing the voltage on the third node C. Then, the fifth thin film transistor T5 is driven, so that the input terminal of the fifth thin film transistor T5 is connected with a driving current.

In an embodiment, the voltage initialization module includes a sixth thin film transistor T6.

The input terminal of the sixth thin film transistor T6 is connected to the connection point where the first thin film transistor T1 is connected to the second thin film transistor T2, the control terminal of the sixth thin film transistor T6 is connected to an emission signal of the driving circuit, and the output terminal of the sixth thin film transistor T6 is connected to the light-emitting diode D1.

In the embodiment, the six thin film transistor T6 is an N-type transistor, but it may also be a P-type transistor in practical. That is to say, since the first thin film transistor T1, the second thin film transistor T2, the third thin film transistor T3, the fourth thin film transistor T4 and the sixth thin film transistor T6 in the driving circuit work in the saturation region or cut-off region, they act as a switch, so any type of N-type transistor or P-type transistor can be used. Besides, since the fifth thin film transistor T5 works in the amplification region, it can only be an N-type transistor. Therefore, the control terminal, the input terminal and the output terminal of the thin film transistors in this embodiment are respectively equivalent to the gate, the drain and the source.

The emission signal received by the control terminal of the sixth thin film transistor T6 is configured for controlling the sixth thin film transistor T6 to turn on, so as to drive the light-emitting diode D1 to emit light.

In an embodiment, an output terminal of the first thin film transistor T1 is connected to an input terminal of the second thin film transistor T2, an output terminal of the second thin film transistor T2 is connected to a positive electrode of the capacitor C1, an output terminal of the third thin film transistor T3 is connected to a negative electrode of the capacitor C1, and an output terminal of the fourth thin film transistor T4 is connected to the negative electrode of the capacitor C1.

In response to that a control terminal of the first thin film transistor T1 is turned on by a high level, control terminals of the second thin film transistor T2, the third thin film transistor T3 and the fourth thin film transistor T4 are turned off by a low level, respectively.

In the embodiment, there are four periods during the correction of the driving current. The first period: a high level is input to the control terminal of the first thin film transistor T1 through the first level signal output terminal S1, so that the first thin film transistor T1 is turned on. Based on the turned-on first thin film transistor T1, an initialization voltage Vref is written into the voltage writing terminal V1, and the current initialization voltage Vref will initialize the voltage in the first node A (i.e., the connection point where the first thin film transistor T1 is connected to the second thin film transistor T2) through the first thin film transistor T1. Therefore, the voltage of the first node A is the initialization voltage Vref. Referring to FIG. 2, the first node A is connected to the positive electrode of the light-emitting diode D1, and is initialized with the initialization voltage Vref input into the voltage writing terminal V1 through the turned-on first thin film transistor T1, and further stabilizing the voltage of the first node A at the initialization voltage Vref, so as to ensure the positive voltage of the light-emitting diode D1 in each driving circuit being stable at the same voltage, to eliminate the coupling capacitor C1 at the connection point between the sixth thin film transistor T6 and the light-emitting diode D1. In this way, it avoids the positive voltage of the light-emitting diode D1 from different caused by the residual charge, to avoid the problem that the light-emitting diode D1 emits light due to different when there is no need to emit light.

In an embodiment, in response to that the control terminals of the first thin film transistor T1, the second thin film transistor T2 and the fourth thin film transistor T4 are turned on by the high level, respectively, the control terminal of the third thin film transistor T3 is turned off by the low level.

As long as the voltage of the first node A stabilizes at the initialization voltage Vref, the process enters the second period. The first level signal output terminal S1 and the second level signal output terminal S2 in the second period input high levels to the control terminals of the first thin film transistor T1, the second thin film transistor T2 and the fourth thin film transistor T4, so that the first thin film transistor T1, the second thin film transistor T2 and the fourth thin film transistor T4 are turned on. At this time, based on the respective voltage difference between the control terminal and the output terminal of the turned-on second thin film transistor T2 and the fourth thin film transistor T4, the voltage of the second node B (i.e., the connection point between the second thin film transistor T2 and the capacitor C1 and the fifth thin film transistor T5) is stabilized at the threshold voltage Vth. Although the threshold voltage Vth is the driving voltage for driving the light-emitting diode D1 to emit light, the current threshold voltage is not yet able to turn on the fifth thin film transistor T5, because the fifth thin film transistor T5 works in the amplification region. It indicates that the current threshold voltage Vth cannot make the light-emitting diode D1 reach the preset luminous intensity (i.e, the luminous intensity for driving the light-emitting diode D1 to emit light normally). If the light-emitting diode D1 is directly driven based on the current threshold voltage Vth, the brightness of the light-emitting diode D1 may be insufficient to cause uneven light in the OLED display.

In an embodiment, in response to that the control terminals of the first thin film transistor T1 and the third thin film transistor T3 are turned on by the high level, respectively, the control terminals of the second thin film transistor T2 and the fourth thin film transistor T4 are turned off by the low level, respectively.

When the voltage of the second node B stabilizes at the initialization voltage Vth, the process enters the third period. The second level signal output terminal S2 in the third period stops inputting a high level, so that the second thin film transistor T2 and the fourth thin film transistor T4 are turned off, while the first level signal output terminal S1 still inputs a high level to the control terminal of the first thin film transistor T1 to keep it turned-on, and the third level signal output terminal S3 starts to input a high level to the control terminal of the third thin film transistor T3, so that the third thin film transistor T3 is turned on. Since the input terminal of the third thin film transistor T3 is connected to the data voltage (Vdata) terminal DATA, the third thin film transistor T3 that is currently turned-on starts to transmit the data signal written in the data voltage (Vdata) terminal DATA. The data signal can be regarded as the data voltage Vdata. It can be seen from FIG. 2, the third node C is the connection point between the third thin film transistor T3 and the capacitor C1, and the second node B is the connection point between the fifth thin film transistor T5 and the capacitor C1. When the third thin film transistor T3 is input with the data voltage Vdata, the current voltage of the third node C rises to the voltage of data voltage Vdata. Based on the characteristic that the voltage across the capacitor C1 is constant, the data voltage Vdata on the third node C is directly superimposed on the threshold voltage Vth of the second node B to compensate the threshold voltage Vth of the second node B, so that the current voltage of the second node B is the driving voltage for driving the fifth thin film transistor T5 to be turned on, which is Vdata+Vth.

It should be noted that, in addition to directly superimposing the data voltage Vdata of the third node C to the threshold voltage Vth of the second node B, and compensating the threshold voltage Vth to avoid the drift of threshold voltage, the capacitor C1 can also isolate the DC current, so as to preventing the DC current from affecting the driving current input to the fifth thin film transistor T5 and output to the light-emitting diode D1. That is because the voltage on the capacitor C1 is constant, there is no potential difference, so no current will flow through the capacitor C1.

In an embodiment, the output terminal of the fifth thin film transistor T5 is connected to an input terminal of the six thin film transistor T6;

in response to that the control terminal of the fifth thin film transistor T5 is turned on by the driving voltage, and the control terminal of the six thin film transistor T6 is turned on by the high level, the control terminals of the first thin film transistor T1, the second thin film transistor T2, the third thin film transistor T3 and the fourth thin film transistor T4 are turned off by the low level, respectively.

When the voltage of the second node B is the driving voltage, the fifth thin film transistor T5 is turned on, and the driving circuit enters the fourth period. The drain of the turned-on fifth thin film transistor T5 is input with the driving current. The threshold voltage Vth is compensated by the data voltage Vdata at the second node B, and the positive electrode of the light-emitting diode D1 is stable at the same voltage (i.e. the initialization voltage Vref). So driving the light-emitting diode D1 based on the current driving can avoid insufficient luminous intensity and unexpected light of the light-emitting diode D1. Therefore, when the control terminal of the sixth thin film transistor T6 is connected to a high level through the emission signal terminal (Emit), it indicates that there is a need to drive the light-emitting diode D1 of the driving circuit to emit light. Then the sixth thin film transistor T6 is turned on, and the driving current is input into the light-emitting diode D1, so that the light-emitting diode D1 is driven to emit light. The negative electrode of the light-emitting diode D1 is connected to the ground VSS.

It should be noted that in the fourth period, the third thin film transistor T3 is turned off, and when the light-emitting diode D1 is driven to emit light, the first thin film transistor T1 is also turned off.

In an embodiment, the driving circuit further includes a controller.

The control terminal of the first thin film transistor T1 is connected to the a first level signal output terminal S1 of the controller, the control terminals of the second thin film transistor T2 and the fourth thin film transistor T4 are connected to a second level signal output terminal S2 of the controller respectively; and the control terminal of the third thin film transistor T3 is connected to a third level signal output terminal S3 of the controller, and the control terminal of the six thin film transistor T6 is connected to the emission signal terminal Emitt of the controller. The controller outputs different level states to the corresponding thin film transistors on different signal output terminals, so as to control the on or off of different thin film transistors, so that the driving circuit enters different driving periods. (i.e., the first period, the second period, the third period, the fourth period).

Furthermore, the present disclosure also provides a driving method. The driving method of the present disclosure is applied to the driving circuit in any one of the above embodiments.

Figure 3:
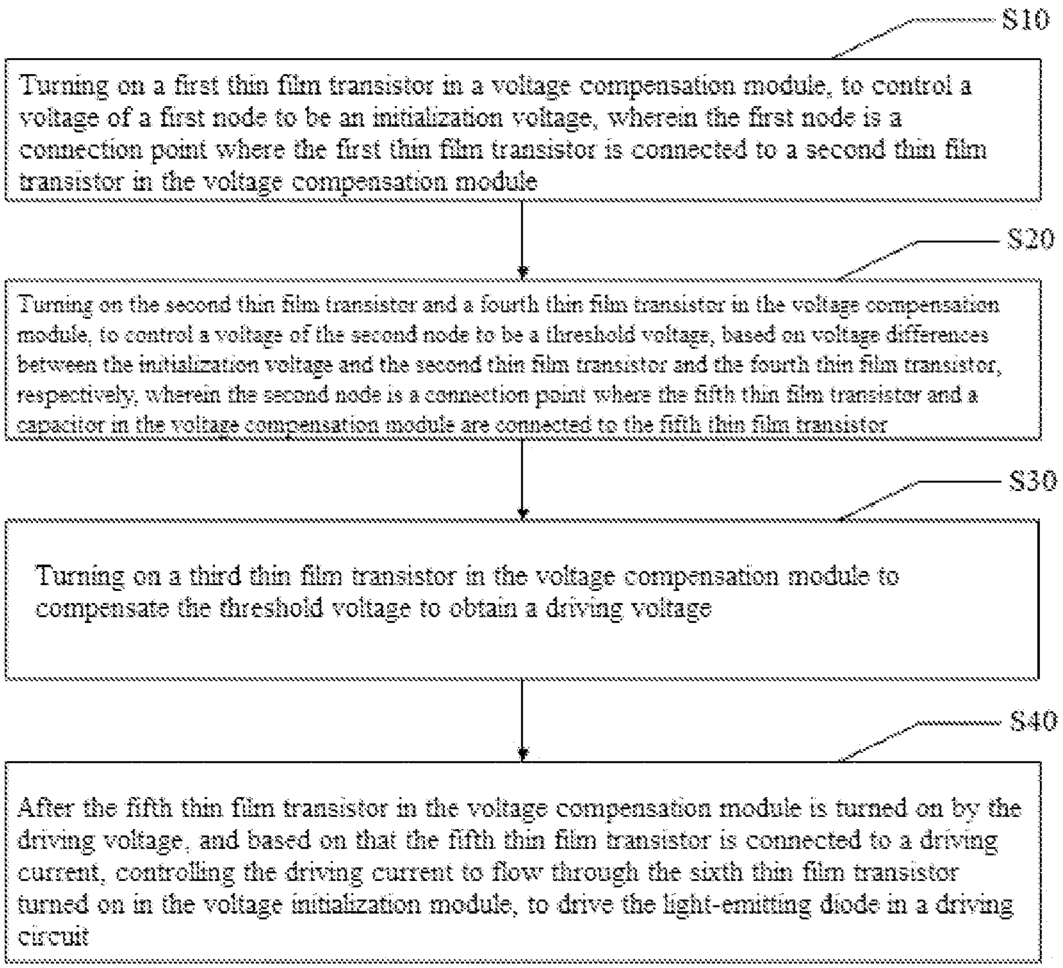
FIG. 3 is a schematic flowchart of a driving method according to an embodiment of the present disclosure.

Referring to FIG. 3, in an embodiment of the driving method of the present disclosure, the driving method includes:

S10, turning on a first thin film transistor in a voltage compensation module, to control a voltage of a first node to be an initialization voltage, the first node is a connection point where the first thin film transistor is connected to a second thin film transistor in the voltage compensation module.

S20, turning on the second thin film transistor and a fourth thin film transistor in the voltage compensation module, to control a voltage of the second node to be a threshold voltage, based on voltage differences between the initialization voltage and the second thin film transistor and the fourth thin film transistor, respectively, the second node is a connection point where the fifth thin film transistor and a capacitor in the voltage compensation module are connected to the fifth thin film transistor.

S30, turning on a third thin film transistor in the voltage compensation module to compensate the threshold voltage to obtain a driving voltage.

S40, after the fifth thin film transistor in the voltage compensation module is turned on by the driving voltage, and based on that the fifth thin film transistor is connected to a driving current, controlling the driving current to flow through the sixth thin film transistor turned on in the voltage initialization module, to drive the light-emitting diode in a driving circuit.

Figure 4:
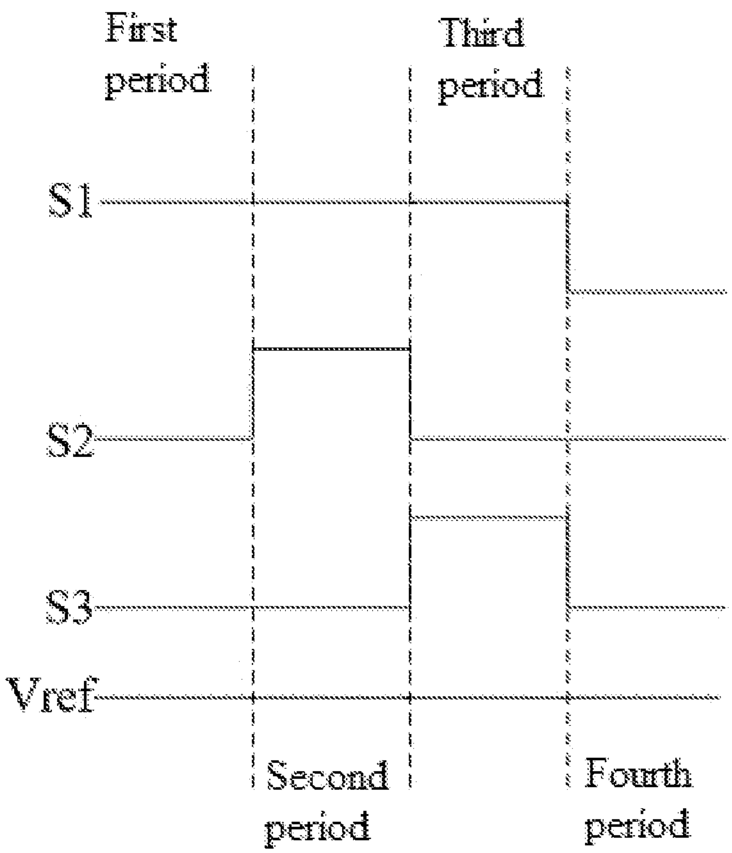
FIG. 4 is a schematic diagram of a timing sequence of a level signal output terminal and the initialization voltage at different time periods.

Referring to FIGS. 2 and 4, there are four periods in the driving method of the embodiment, and the states of the level signal output terminals are different in different periods, while the initialization voltage always remains input status. These four periods are described in detail as follows:

The first period: a high level is input to the control terminal of the first thin film transistor through the first level signal output terminal, so that the first thin film transistor is turned on. Based on the turned-on first thin film transistor, an initialization voltage is written into the voltage writing terminal, and the current initialization voltage will initialize the voltage in the first node through the first thin film transistor. Therefore, the voltage of the first node is the initialization voltage. It further ensures that the positive voltage of the light-emitting diode in each driving circuit is stable at the same voltage, and avoids the problems that the positive voltage of the light-emitting diode is different caused by the residual charges, to avoid the problem that the light-emitting diode emits light due to different when there is no need to emit light.

The second period: the first level signal output terminal and the second level signal output terminal input high levels to the control terminals of the first, the second and the fourth thin film transistor, so that the first, the second and the fourth thin film transistor are turned on. At this time, based on the respective voltage difference between the control terminal and the output terminal of the turned-on second and the fourth thin film transistor, the voltage of the second node is stabilized at the threshold voltage.

The third period: the second level signal output terminal stops inputting a high level, so that the second and the fourth thin film transistor are turned off, while the first level signal output terminal still inputs a high level to the control terminal of the first thin film transistor to keep it turned on, and the third level signal output terminal starts to input a high level to the control terminal of the third thin film transistor, so that the third thin film transistor is turned on. Since the input terminal of the third thin film transistor is connected to the data voltage terminal, the third thin film transistor that is currently turned-on starts to transmit the data signal written in the data voltage terminal. The data signal can be regarded as the data voltage. The data voltage is directly added on the threshold voltage of the second node to compensate the threshold voltage of the second node, so that the current voltage of the second node acts as the driving voltage to drive the fifth thin film transistor to turn on, to avoid the uneven light in the OLED display caused by insufficient luminous luminance of the light-emitting diode based on the uncompensated threshold voltage.

The fourth period: based on the step that the driving voltage drives the fifth thin film transistor to turn on, the input terminal of the turned-on fifth thin film transistor is input with the driving current. When the control terminal of the sixth thin film transistor is connected to a high level through the emission signal terminal, indicating that there needs to drive the light-emitting diode of the driving circuit to emit light, the sixth thin film transistor is turned on. Because the voltage of the first node is the initialization voltage, thus there is no residual charge to affect, the driving current is input into the light-emitting diode, so that the light-emitting diode is driven to emit light.

It should be noted that in the fourth period, the first thin film transistor, the second thin film transistor, the third thin film transistor and the fourth thin film transistor are turned off.

In the embodiment, the initialization voltage is written into the first node through the first thin film transistor, to control the positive voltage of the light-emitting diode in each driving circuit to be stable at the same voltage, to avoid the positive voltage of the light-emitting diode from different caused by the residual charges of the sixth thin film transistor, to avoid the problem that the light-emitting diode emits light due to different when there is no need to emit light. By compensating the threshold voltage of the second node, caused by variation of the temperature, by the third thin film transistor receiving the data signal, so as to solve the problem of uneven light of the OLED display caused by the fluctuation of the output driving current due to the variation of the threshold voltage, to ensure the accuracy of driving the light-emitting diodes by the driving current, and improve the picture quality and visual effect of the display.

In addition, the present disclosure also provides a display panel, including the above-mentioned driving circuit, the memory, the processor, and the computer processing program stored in the memory and operable on the processor. The processor, when executing the computer processing program, implements the above driving method.

It should be noted that in the document, the terms "comprise", "include" or any other variants thereof are intended to cover a non-exclusive inclusion. Thus, a process, method, article, or system that includes a series of elements not only includes those elements, but also includes other elements that are not explicitly listed, or also includes elements inherent to the process, method, article, or system. If there are no more restrictions, the element defined by the sentence "including a . . . " does not exclude the existence of other identical elements in the process, method, article or system that includes the element.

The above-mentioned serial numbers of the embodiments of the present disclosure are merely for description and do not represent the merits of the embodiments.

Through the above description of the embodiments, those skilled in the art will clearly understand that the method of the above embodiments can be implemented by software plus a necessary general hardware platform, and certainly can also be implemented by hardware, but in many cases, the former is a better implementation manner. Based on such understanding, the technical solutions of the present disclosure or portions thereof that contribute to the related art may be embodied in the form of a software product, where the computer software product is stored in a storage medium (e.g., a Read Only Memory (ROM)/Random Access Memory (RAM), a magnetic disk, an optical disk), and includes several instructions for enabling a terminal device (which may be a mobile phone, a computer, a server, or a network device) to execute the method according to the embodiments of the present disclosure.

The above are only some embodiments of the present disclosure, and do not limit the scope of the present disclosure thereto. Under the concept of the present disclosure, any equivalent structural transformations made according to the description and drawings of the present disclosure, or any direct/indirect application in other related technical fields are included in the scope of the present disclosure.

What is claimed is:

1. A driving circuit, comprising:

a voltage initialization module;

a voltage compensation module connected to the voltage initialization module; and a light-emitting diode connected to the voltage initialization module; wherein the voltage compensation module is configured to compensate a threshold voltage of the driving circuit to obtain a driving voltage, and make the driving circuit connect to a driving current based on the driving voltage;

the voltage initialization module is configured to eliminate residual charges, to make the driving circuit drive the light-emitting diode through the driving current;

the voltage compensation module comprises a first thin film transistor, a second thin film transistor, a third thin film transistor, a fourth thin film transistor, a fifth thin film transistor and a capacitor;

an output terminal of the first thin film transistor is connected to an input terminal of the second thin film transistor;

an output terminal of the second thin film transistor is connected to a positive electrode of the capacitor, an output terminal of the third thin film transistor is connected to a negative electrode of the capacitor, an output terminal of the fourth thin film transistor is connected to the negative electrode of the capacitor, and a control terminal of the fifth thin film transistor is connected to the positive electrode of the capacitor;

the first thin film transistor and the second thin film transistor are connected in series to the positive electrode of the capacitor, and an output terminal of the fifth thin film transistor is connected to a connection point where the first thin film transistor is connected to the second thin film transistor, and an input terminal of the fifth thin film transistor is connected to the driving current of the driving circuit;

the third thin film transistor and the fourth thin film transistor are connected in parallel to the negative electrode of the capacitor;

the voltage initialization module comprises a sixth thin film transistor;

an input terminal of the sixth thin film transistor is connected to the connection point where the first thin film transistor is connected to the second thin film transistor, a control terminal of the sixth thin film transistor is connected to an emission signal of the driving circuit, and an output terminal of the sixth thin film transistor is connected to the light-emitting diode;

in response to that a control terminal of the first thin film transistor is turned on by a high level, control terminals of the second thin film transistor, the third thin film transistor and the fourth thin film transistor are turned off by a low level, respectively;

in response to that the control terminals of the first thin film transistor, the second thin film transistor and the fourth thin film transistor are turned on by the high level, respectively, the control terminal of the third thin film transistor is turned off by the low level;

in response to that the control terminals of the first thin film transistor and the third thin film transistor are turned on by the high level, respectively, the control terminals of the second thin film transistor and the fourth thin film transistor are turned off by the low level, respectively; and in response to that the control terminal of the fifth thin film transistor is turned on by the driving voltage, and the control terminal of the six thin film transistor is turned on by the high level, the control terminals of the first thin film transistor, the second thin film transistor, the third thin film transistor and the fourth thin film transistor are turned off by the low level, respectively.

2. The driving circuit according to claim 1, wherein the output terminal of the fifth thin film transistor is connected to an input terminal of the six thin film transistor.

3. The driving circuit according to claim 2, further comprising a controller; wherein the control terminal of the first thin film transistor is connected to a first level signal output terminal of the controller, the control terminals of the second thin film transistor and the fourth thin film transistor are connected to a second level signal output terminal of the controller respectively; and the control terminal of the third thin film transistor is connected to a third level signal output terminal of the controller, and the control terminal of the six thin film transistor is connected to the emission signal terminal of the controller.

4. A driving method, applied to the driving circuit according to claim 1, comprising:

turning on the first thin film transistor in the voltage compensation module, to control a voltage of a first node to be an initialization voltage, wherein the first node is a connection point where the first thin film transistor is connected to the second thin film transistor in the voltage compensation module;

turning on the second thin film transistor and the fourth thin film transistor in the voltage compensation module, to control a voltage of a second node to be a threshold voltage, based on voltage differences between the initialization voltage and the second thin film transistor and the fourth thin film transistor, respectively, wherein the second node is a connection point where the fifth thin film transistor and a capacitor in the voltage compensation module are connected to the fifth thin film transistor;

turning on the third thin film transistor in the voltage compensation module to compensate the threshold voltage to obtain the driving voltage; and after the fifth thin film transistor in the voltage compensation module is turned on by the driving voltage, and based on that the fifth thin film transistor is connected to the driving current, controlling the driving current to flow through the sixth thin film transistor turned on in the voltage initialization module, to drive the light-emitting diode in the driving circuit.

5. A display panel, comprising:

a driving circuit, a memory, a processor, and a computer processing program stored in the memory and operable on the processor, wherein the processor, when executing the computer processing program, implements the driving method according to claim 4.

* * * * *